(12) United States Patent
Baumann

(10) Patent No.: US 9,073,632 B2
(45) Date of Patent: Jul. 7, 2015

(54) AERODYNE INCLUDING MOTORIZED UNDERCARRIAGES

(75) Inventor: Cedric Baumann, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 867 days.

(21) Appl. No.: 13/278,826

(22) Filed: Oct. 21, 2011

(65) Prior Publication Data

US 2012/0104160 A1 May 3, 2012

(30) Foreign Application Priority Data

Oct. 28, 2010 (FR) ...................................... 10 58910

(51) Int. Cl.
*B64C 25/00* (2006.01)
*B64C 25/40* (2006.01)

(52) U.S. Cl.
CPC ........... *B64C 25/405* (2013.01); *B64D 2205/00* (2013.01); *B64D 2221/00* (2013.01); *Y02T 50/823* (2013.01)

(58) Field of Classification Search
CPC   B64C 25/40; B64C 25/405; B64D 2027/026; B64D 41/00; B64D 2221/00
USPC ...... 244/50, 58, 103 R, 103 S; 301/6.2; 318/1
See application file for complete search history.

(56) References Cited

U.S. PATENT DOCUMENTS

| 3,807,664 A | 4/1974 | Kelly, Jr. et al. |
| 3,874,619 A * | 4/1975 | Collins et al. ................... 244/50 |
| 7,445,178 B2 * | 11/2008 | McCoskey et al. ............. 244/50 |
| 2006/0065779 A1 | 3/2006 | McCoskey et al. |
| 2009/0218440 A1 | 9/2009 | Dilmaghani et al. |
| 2011/0290933 A1 * | 12/2011 | Cros et al. ....................... 244/50 |

OTHER PUBLICATIONS

French Preliminary Search Report issued in French Application No. 1058910 dated Jul. 12, 2011 (with translation).

* cited by examiner

*Primary Examiner* — Rob Swiatek
*Assistant Examiner* — Marc Burgess
(74) *Attorney, Agent, or Firm* — Jenkins, Wilson, Taylor & Hunt, P.A.

(57) ABSTRACT

The aerodyne, e.g. an airplane, includes: an auxiliary power unit suitable for producing electricity; a first electricity distributor connected to the unit; at least one flight propulsion engine including an electricity generator; at least one undercarriage motor, the motor enabling the aerodyne to taxi; and a second electricity distributor connected to the generator and to the undercarriage motor in order to transmit electricity from the generator to the motor independently of the first distributor.

10 Claims, 2 Drawing Sheets

AERODYNE INCLUDING MOTORIZED UNDERCARRIAGES

FIELD OF THE INVENTION

The invention relates to aerodynes, in particular airplanes.

BACKGROUND OF THE INVENTION

It is known to tow an airplane by means of a vehicle from its parking position in order to cause it to taxi over a portion of its path to a takeoff runway. However airports charge airlines for the use of such a vehicle. Proposals have been for an airplane to taxi under its own power by fitting one or more of its undercarriages with electric motors. However that can require the onboard electricity network and the auxiliary power unit to be overdimensioned. That is why, while the airplane is reversing from its parking position, provision is made to start one of the jets of the airplane. Once the jet is running, the onboard electricity network is also powered by the electricity generator associated with the jet. It can therefore deliver the power required for taxiing to the motorized undercarriage. Nevertheless, that mode of operation is not optimized.

OBJECT AND SUMMARY OF THE INVENTION

An object of the invention is to optimize the onboard electricity installation and the use of the available electrical power while taxiing.

To this end, the invention provides an aerodyne that comprises:
- an auxiliary power unit suitable for producing electricity;
- a first electricity distributor connected to the unit;
- at least one flight propulsion engine including an electricity generator;
- at least one undercarriage motor, the motor enabling the aerodyne to taxi; and
- a second electricity distributor connected to the generator and to the undercarriage motor in order to transmit electricity from the generator to the motor independently of the first distributor.

The invention is applicable to all aerodynes, i.e. aircraft that fly mainly as a result of aerodynamic forces. It applies to "heavier-than-air" aircraft capable of flying and in which lift is provided by wings. In an airplane the wings are stationary, and in a helicopter they are rotary. Aerodynes may be provided with motorized undercarriages.

Thus, it is possible to power the undercarriage motors with electricity coming from the generator via the second electricity distributor in a manner that is independent of the power supplied to the other onboard systems from the auxiliary power unit. The auxiliary power unit therefore does not need to deliver electrical power to the undercarriage motors, so the power available from the unit can be devoted to other onboard equipment.

Advantageously, the second distributor is connected to the first distributor.

Thus, when appropriate, it is possible to transfer electrical power from the first distributor to the second.

Preferably, the aerodyne includes a plurality of undercarriage motors suitable for causing the aerodyne to taxi and connected to the second distributor independently of one another.

The invention also provides a method of controlling an aerodyne, wherein, simultaneously:
- an auxiliary electrical power unit produces electricity feeding a first electricity distributor; and
- a generator of a flight propulsion engine feeds electricity, independently of the first distributor, to at least one undercarriage motor causing the aerodyne to taxi.

Preferably, taxiing takes place forwards.

Advantageously, the generator exclusively powers the or each undercarriage motor causing the aerodyne to taxi.

Thus, the electrical power available from the generator is dedicated entirely to powering the undercarriage motors.

Preferably, the or each undercarriage motor that causes the aerodyne to taxi is powered exclusively from the generator.

Thus, the undercarriage motors take their energy solely from the generator, such that the power available from the auxiliary power unit can be devoted entirely to other systems of the aerodyne.

Advantageously, the aerodyne has at least one other flight propulsion engine, and the other flight propulsion engine or at least one of the other flight propulsion engines is kept shut down.

Preferably, while the flight propulsion engine(s) is/are shut down, the undercarriage motor(s) cause(s) the aerodyne to taxi in reverse.

Thus, while reversing, the onboard electrical loads are powered by the auxiliary power unit. The auxiliary power unit is generally dimensioned so as to have a margin in terms of available electric power, which margin on its own suffices to power the undercarriage motors in order to taxi in reverse with reduced performance. Thus, while reversing, the dimensioning of the auxiliary power unit is generally sufficient on its own to power the undercarriage motors. It is specified here that reversing constitutes a stage during which the taxiing performance of the aerodyne is not critical. (Nevertheless, the power margin is not sufficient for all of the taxiing. In particular, it is generally not possible to achieve forward speeds that are required in order to enable the aerodyne to be integrated appropriately in the ground movements on an airport.)

Advantageously, the flight propulsion engine or one of the flight propulsion engines is started after the aerodyne has taxied in reverse.

This thus avoids starting the engine before the end of taxiing in reverse, since a running engine would generate thrust opposing the reversing movement produced by the undercarriage motors.

BRIEF DESCRIPTION OF THE DRAWINGS

Other characteristics and advantages of the invention appear from the following description of an embodiment given by way of non-limiting example and with reference to the accompanying drawings, in which.

MORE DETAILED DESCRIPTION

Figure 1:
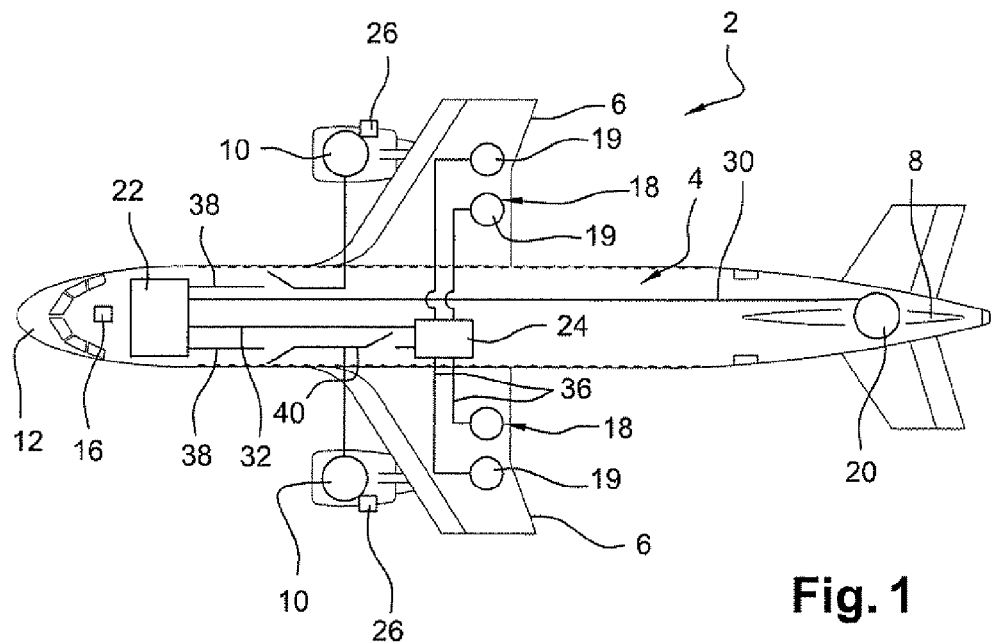
FIGS. 1 and 2 are fragmentary plan views of an airplane of the invention showing two steps of the method of the invention.

FIG. 1 shows an aircraft of the invention. In the present example it is an aerodyne, and specifically an airplane 2 having a fuselage 4 and two wings 6. It includes a tail 8 and jets 10 fixed to respective ones of the wings. At the front of the fuselage 4, the airplane includes a cockpit 12.

The airplane 2 has a nose undercarriage 16 and main undercarriages 18, specifically two main undercarriages, this number not being limiting and it being possible for it to be greater or smaller. Each of the two main undercarriages in this example comprises at least two pairs of wheels. Each of these undercarriages also includes, for each pair of wheels, at least one electric motor 19, such that the undercarriages are capable on their own of enabling the airplane to taxi, forwards or backwards.

The airplane 2 includes an auxiliary power unit (APU) 20. By way of example, it may be a turbogenerator unit comprising a turbine suitable for generating electricity on board the airplane in order to power the various onboard systems electrically while the flight propulsion engines 10 are not running in order to save fuel. Nevertheless, it may also be used when the flight propulsion engines 10 are running, with the airplane being on the ground or in flight.

The airplane 2 has a first distributor 22 formed by an electrical power distribution center (EPEC). This member is also known as the airplane's "electrical master box".

The airplane 2 has a second electricity distributor 24.

Each of the engines 10 of the airplane includes at least one electricity generator 26 driven by the drive energy of the engine.

Concerning the electrical architecture of the invention, the electrical connections are as follows. The airplane 2 has an electrical connection 30 connecting the APU 20 to the first distributor 22 and a connection 32 connecting the first distributor 22 to the second distributor 24. The second distributor is connected by electric connections 36 to the electric motors 19 of the undercarriages 18. There are four such motors in this example, so there are four connections 36. The undercarriage motors 19 are thus connected to the second distributor 24 independently of one another.

The generator 26 of each engine 10 is connected by a respective connection 38 to the main distributor 22. In addition, the generator 26 of the first engine 10, situated further down in FIG. 1, is connected by a connection 40 directly to the second distributor 24.

All of these connections for electrical connections serve to convey electricity, where appropriate when switches they carry are suitably positioned.

Figure 3:
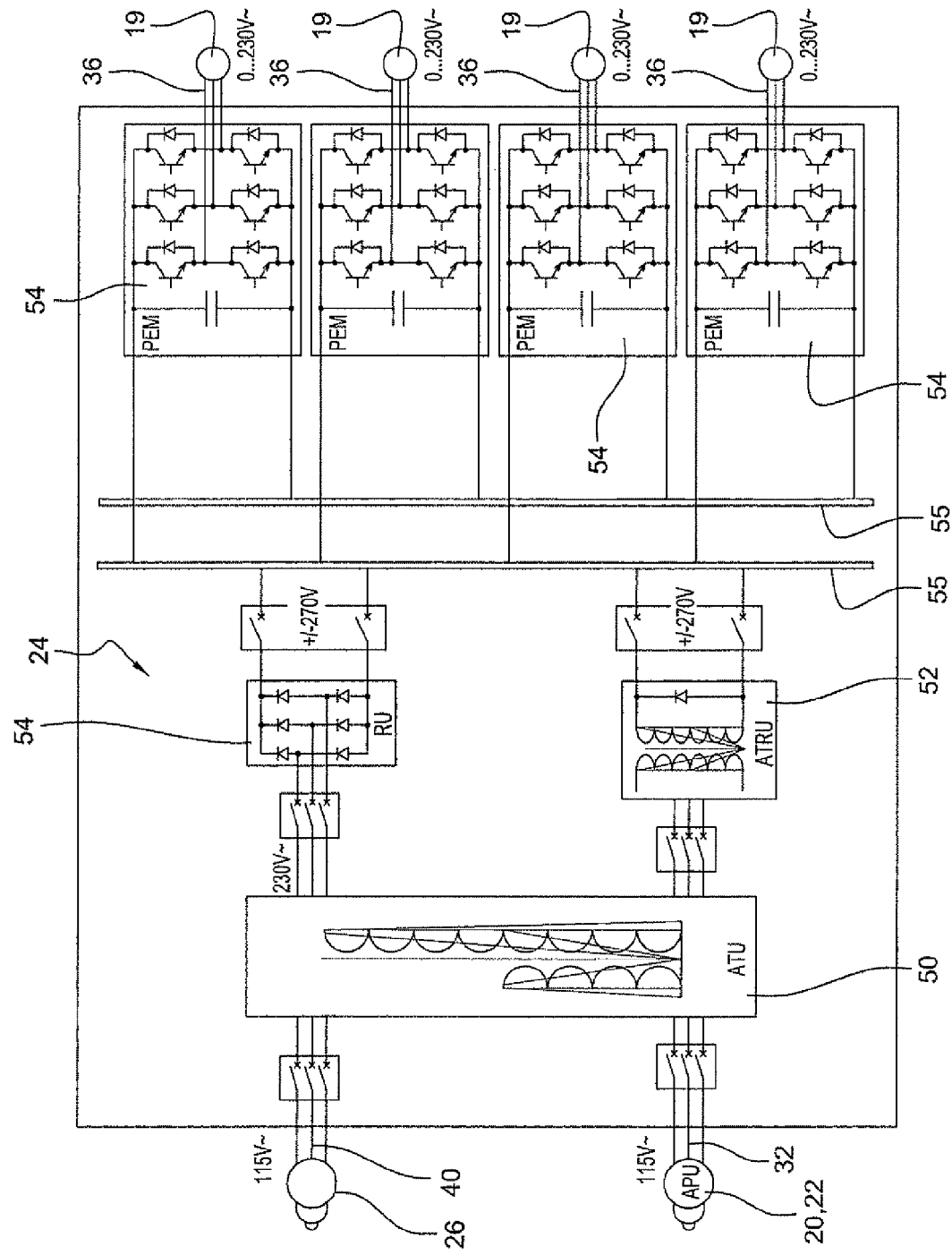
FIG. 3 is a diagram showing the content of the second distributor in detail.

The second distributor 24 is shown in detail in FIG. 3. It is connected to the first distributor 22 via the connection 32, e.g. at 115 volts (V). It is likewise connected to the generator 26 of the first engine using 115 V.

It includes a voltage converter or autotransformer unit ATU 50 that serves to transform the AC voltage of 115 V of each of these connections into an AC voltage of 230 V. The converter in this example is common to both connections 32 and 40.

It includes a voltage converter and rectifier or autotransformer rectifier unit (ATRU) 52 that transforms the AC voltage of 230 V into a DC voltage of 540 V on the associated branch of the APU.

It includes a voltage rectifier unit (RU) 54 that transforms the AC voltage of 230 V into a DC voltage of 540 V on the associated branch of the generator, but without complying with electrical quality standards, unlike the ATRU 52.

Thus, the distributor 24 receives as input an AC voltage of 115 V at 400 hertz (Hz), and it raises it into the form of an AC voltage at 230 V and then rectifies it to produce a DC voltage of 540 V.

The ATRU 52 and the rectifier 54 are connected in parallel on lines 55 for electrically powering the motors 19.

Finally, the distributor includes electronic power units or power electronic modules (PEMs) 56 that are associated with the respective undercarriage motors 19. These units are also connected in parallel to the lines 55. Each unit shapes the voltage that is available upstream into a downstream form that is suitable for controlling the respective wheel motors 19.

All of these connections in this example serve to convey three-phase electricity. The voltage values are given purely by way of example.

An implementation of the method of the invention is described below with respect to the airplane 2.

It is assumed that the airplane is initially stationary at its parking position on an airport. Before acceleration along the runway for takeoff, the airplane will begin by taxiing in reverse and then continue by taxiing forwards.

The configuration of the airplane before it begins to taxi in reverse is shown in FIG. 1. The connection 38 from each generator 26 to the first distributor 22 is interrupted by opening a switch. The same applies to the connection from the generator 26 of the first engine to the second distributor.

The airplane taxis to the takeoff runway under its own power. To do this, the undercarriage motors are powered with electricity coming from the APU via the two distributors. Thus, the electricity coming from the APU passes via the connection 30 to the first distributor 22 and it is then transferred via the connection 32 to the second distributor 24 in order to terminate via the respective connections 36 to the motors 19. While it is taxiing in reverse, the APU powers systems on board the aircraft other than the motors 19. It also presents residual power that is available for powering the motors 19 in order to enable the airplane to taxi in reverse. The airplane thus reverses using electricity delivered solely by the APU 20. During this reverse taxiing stage, and until it has been finished, the engines 10 are shut down.

Figure 2:
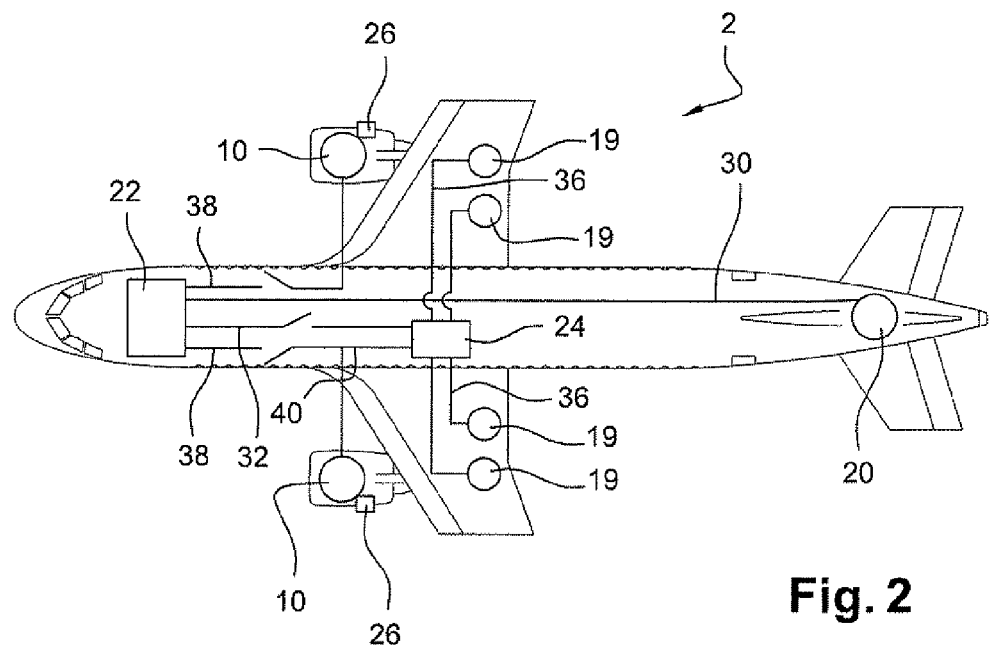

At the end of reverse taxiing, the airplane is stopped and begins to taxi forwards. To do this, the APU is used to start the first flight propulsion engine 10. In addition, the switch in the connection 40 connecting the generator of said engine to the second distributor 24 is closed so that the airplane is in the electrical configuration shown in FIG. 2. Furthermore, a switch is opened in the connection 32 so as to isolate the second distributor 24 from the first distributor 22. For forward taxiing, each of the motors 19 is powered solely from the generator 26 of the first engine 10 via the second distributor 24. Electricity thus passes from the generator 26 to the distributor 24 without passing via the first distributor 22, and then reaches each of the motors 19 via the corresponding connections 36. The generator 26 powers only the undercarriage motors 19. At the same time, these motors are electrically powered solely by the generator 26. During this time, the APU delivers electrical power to the systems of the airplane via the first distributor 22, without passing via the second distributor 24, the first distributor being connected to said systems in a manner that is not shown. While taxiing forwards, and while the first engine is in operation, the engine delivers thrust that contributes to driving the airplane.

Since the circuits associated with the APU and the first distributor 22 are independent of and electrically insulated from the circuits associated with the generator 26 and the second distributor 24, it is ensured that putting the generator 26 of the first engine in operation does not give rise to transient conditions appearing on the main onboard electricity network. In addition, taxiing is optimized insofar as the generator 26 is dedicated to the motors 19. In particular, it can be seen that while taxiing forwards, the operation of the engine 10 together with its generator 26 takes place without the generator powering electrical loads of the airplane other than the motors 19.

While taxiing forwards, the second engine 10 remains shut down. It is only shortly before reaching the takeoff runway that the second engine is put into operation so that it warms up appropriately prior to accelerating for takeoff.

The invention serves to minimize the impact of installing electric motors on the undercarriages to enable the airplane to taxi under its own power. It makes it possible at low cost to adapt the electrical architecture of the airplane to make such self-powered taxiing possible.

Numerous modifications may be made to the invention without going beyond the ambit thereof.

Independently of the invention, it is possible to implement a method of controlling an aerodyne in which, while the aerodyne is reversing, an auxiliary electrical power unit of the aerodyne powers one or more undercarriage motors to cause the aerodyne to taxi, while the flight propulsion engine(s) is/are shut down.

The invention claimed is:

1. An aerodyne, comprising:
    an auxiliary power unit comprising a first generator of electricity suitable for producing electricity;
    a first electricity distributor connected to the unit;
    at least one flight propulsion engine including a second electricity generator;
    at least one undercarriage motor, the motor enabling the aerodyne to taxi;
    wherein the first electricity distributor is suitable for supplying members of the aerodyne other than an undercarriage motor through a first circuit exclusively with electricity from the first generator,
    wherein the second electricity distributor is supplying at least one undercarriage motor trough a second circuit exclusively with electricity from the second generator, and
    wherein the two circuits are separated.

2. An aerodyne according to claim 1, wherein the second distributor is connected to the first distributor.

3. An aerodyne according to claim 1, that includes a plurality of undercarriage motors suitable for causing the aerodyne to taxi and connected to the second distributor independently of one another.

4. A method of controlling the aerodyne according to claim 1 comprising:
    producing electricity via the auxiliary power unit and first generator,
    feeding the first electricity distributor via the electricity produced by the auxiliary power unit and first generator; and
    feeding electricity, independently of the first distributor, via the second electricity generator to at least one undercarriage motor causing the aerodyne to taxi.

5. A method according to claim 4, wherein taxiing takes place forwards.

6. A method according to claim 4, wherein the second generator exclusively powers the or each undercarriage motor causing the aerodyne to taxi.

7. A method according to claim 4, wherein the or each undercarriage motor that causes the aerodyne to taxi is powered exclusively from the second generator.

8. A method according to claim 4, wherein the aerodyne has at least one other flight propulsion engine, and the other flight propulsion engine or at least one of the other flight propulsion engines is kept shut down.

9. A method according to claim 8, wherein, while the at least one other flight propulsion engine(s) is/are shut down, the undercarriage motor(s) cause(s) the aerodyne to taxi in reverse.

10. A method according to claim 8, wherein the flight propulsion engine or one of the flight propulsion engines is started after the aerodyne has taxied in reverse.

* * * * *